United States Patent [19]

Harara et al.

[11] Patent Number: 5,265,019
[45] Date of Patent: Nov. 23, 1993

[54] STEERING CONTROL APPARATUS FOR VEHICLE

[75] Inventors: Mitsuhiko Harara; Tadao Tanaka; Masayoshi Nishimori; Youichi Yamamoto, all of Okazaki, Japan

[73] Assignee: Mitsubishi Jidosha Kogyo Kabushiki Kaisha, Tokyo, Japan

[21] Appl. No.: 777,208

[22] Filed: Oct. 16, 1991

[30] Foreign Application Priority Data

Oct. 17, 1990 [JP] Japan .................. 2-278449

[51] Int. Cl.⁵ ............................................. B62D 5/22
[52] U.S. Cl. ................ 364/424.05; 180/141; 180/142
[58] Field of Search .......... 364/424.05; 280/91; 180/79.1, 133, 140-143

[56] References Cited

U.S. PATENT DOCUMENTS

| 3,831,701 | 8/1974 | Pilon et al. ............. | 180/133 |
| 4,834,203 | 5/1989 | Takahashi et al. ....... | 180/79.1 |
| 4,834,205 | 5/1989 | Mizuno et al. .......... | 180/79.1 |
| 4,878,557 | 11/1989 | Shibahata et al. ...... | 180/141 |
| 4,971,175 | 11/1990 | Hamada et al. ......... | 180/142 |
| 5,031,714 | 7/1991 | Nishimori et al. ...... | 180/141 |
| 5,076,381 | 12/1991 | Daido et al. ........... | 364/424.05 |

FOREIGN PATENT DOCUMENTS 3930445  3/1990  Fed. Rep. of Germany.

Primary Examiner—Gary Chin

[57] ABSTRACT

An actuator is used to drive a transmission ratio changing mechanism, which is arranged between a steering wheel and front wheels of a vehicle, for correcting the turning angle of the front wheels. The operation of the actuator is controlled in accordance with detection signals from sensors for detecting first and second turning actions, and an angular turning angular speed of the steering wheel. A controller delivers a corrective turning control signal for increasing the turning angle of the front wheels to the actuator when it is detected that the steering wheel is in the second turning action and that the value of the angular turning speed for the second turning action is at least equal to a reference value.

40 Claims, 9 Drawing Sheets

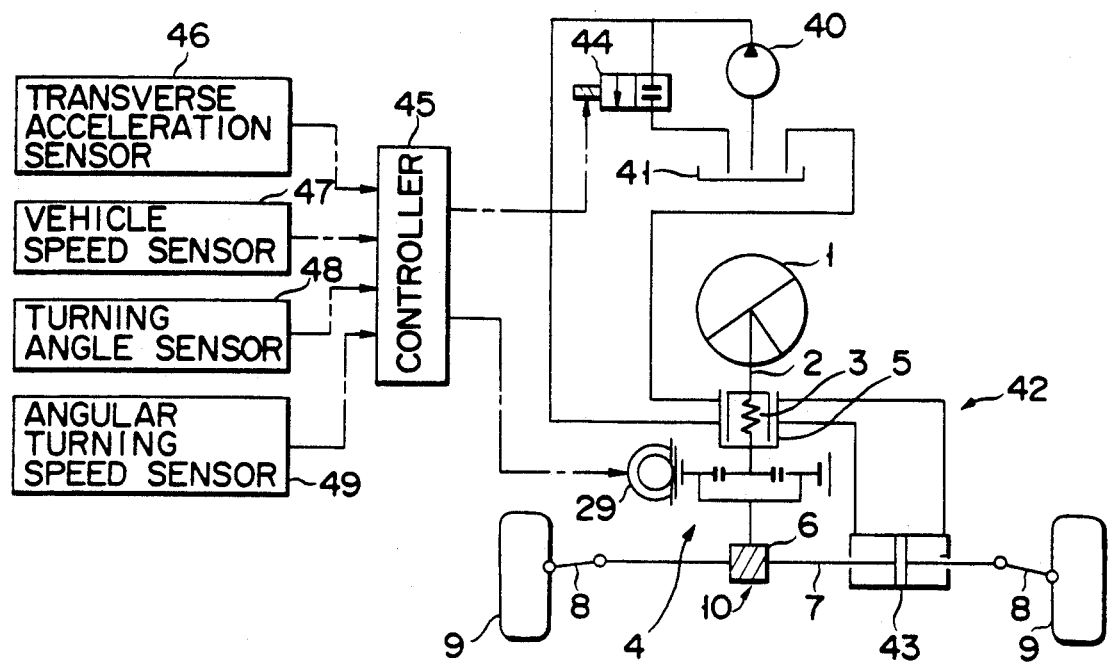
F I G. 1
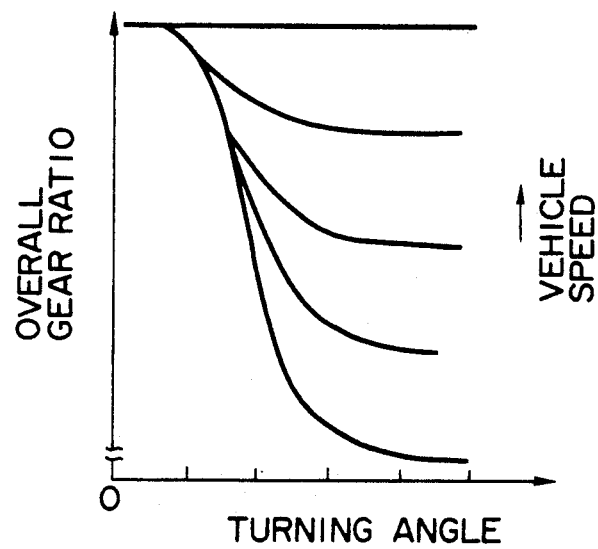
F I G. 4

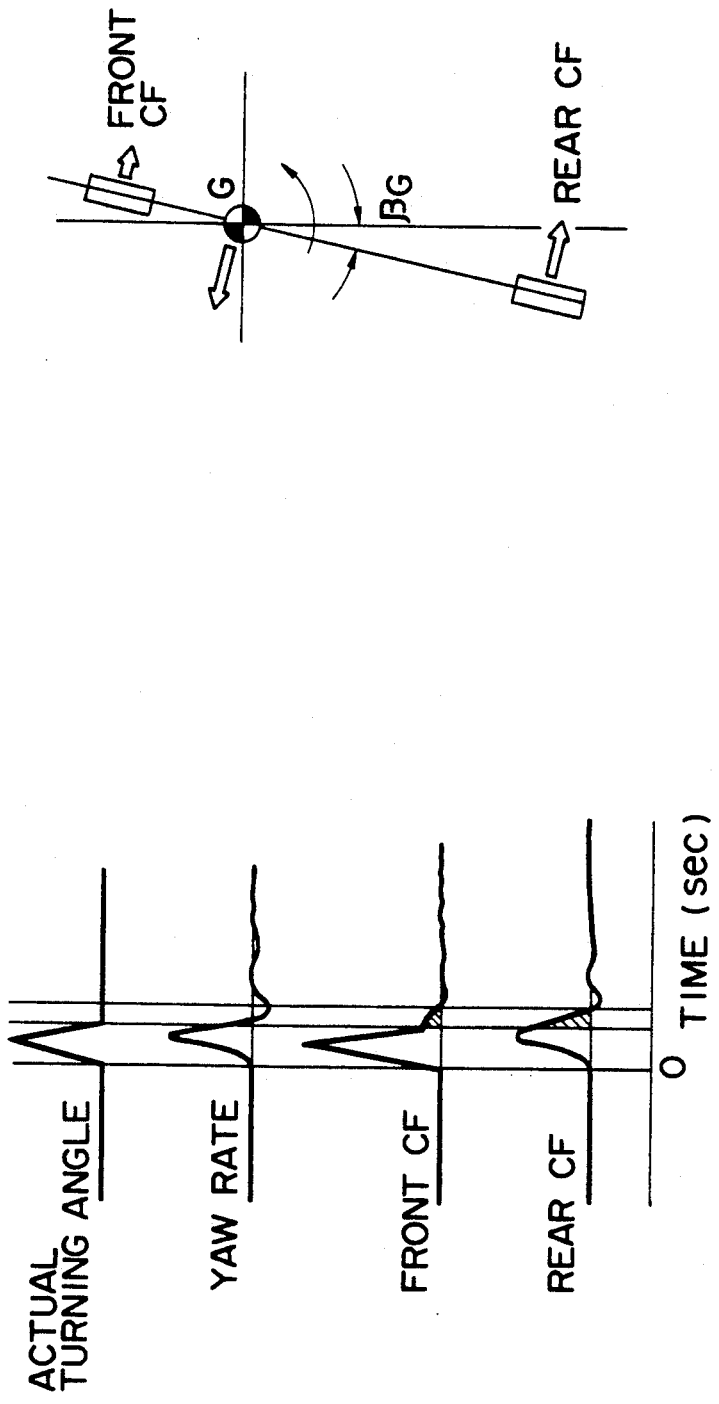

STEERING CONTROL APPARATUS FOR VEHICLE

BACKGROUND OF THE INVENTION

1. Field of the Invention

The present invention relates to a steering control apparatus for a vehicle, and more particularly, to a steering control apparatus for controlling the turning angle of front wheels of a vehicle.

2. Description of the Related Art

Conventionally, a steering apparatus for front wheels of a vehicle, such as an automobile, is designed so that the turning angle of the front wheels is always in proportion to the turning angle of a steering wheel.

When the vehicle, mounted with this conventional steering apparatus, turns or corners at a speed higher than a predetermined level, the front wheels are first turned, so that a slip angle and cornering force (CF) are generated in the front wheels. Thereupon, a yaw moment is produced in the vehicle, so that the vehicle yaws, thereby also generating a slip angle in the rear wheels. As a result, a cornering force is also generated in the rear wheels, so that the vehicle can enjoy a reliable turning or cornering.

In the vehicle of this type, however, the body of the vehicle is subjected to a reactive force in the yawing direction when the front wheels are sharply returned from a cornering state to a straight-ahead state, in particular, so that the driving stability of the vehicle is lowered.

This phenomenon is attributable to the fact that a change of the cornering force of the rear wheels starts with a delay behind that of the front wheels, as shown in FIG. 11. Thus, after turning the steering wheel in a direction from the straight-ahead position (hereinafter, called as a first turning action), when the steering wheel is turned in the opposite direction form the turned position to the straight-ahead position (hereinafter, called as a second turning action), a reduction of the cornering force of the rear wheels delays behind that of the front wheel. In a transient stage of the second turning action, the cornering force of the rear wheels becomes much greater than that of the front wheels. These unbalanced cornering forces causes a reactive force in the yawing direction, as shown in FIG. 12, thus lowering the driving stability of the vehicle. This effect is noticeable when the steering wheel is sharply turned while the vehicle is running at high speed.

SUMMARY OF THE INVENTION

Accordingly, the object of the present invention is to provide a steering control apparatus capable of improving the driving stability of a vehicle during a second turning action of a steering wheel.

In order to achieve the above object, an apparatus according to the present invention comprises: a transmission ratio changing mechanism arranged between a steering wheel and front wheels, for changing a turning angle of the front wheels which is caused by turning the steering wheel; an actuator for driving the transmission ratio changing mechanism to correct the turning angle of the front wheels; turning state sensing means for detecting a first turning action, a second turning action in a direction opposite to a direction of the first turning action, and an angular turning speed of the steering wheel; and control means for controlling the operation of the actuator in accordance with detection signals from the sensing means. The control means delivers a corrective turning control signal, for increasing the turning angle of the front wheels, to the actuator when it is detected that the steering wheel is beginning a second turning action and that the value of the angular turning speed for the second turning action is equal to or higher than a reference value.

According to the present invention, when the control means delivers the corrective turning control signal to the actuator, the actuator drives the transmission ratio changing mechanism so as to increase the turning angle of the front wheels. Therefore, the actual turning angle and slip angle of the front wheels are increased when the steering wheel is sharply turned for a second turning action. Accordingly, the cornering force of the front wheels increases, so that it can be prevented that the cornering force of the rear wheels becomes much greater than that of the rear wheel. Thus, the respective cornering forces of the front and rear wheels can be balanced with each other even when the steering wheel is sharply turned in the second turning action. Consequently, the body of the vehicle can be effectively prevented from being subjected to a reactive force in the yawing direction when the body is returned to the straight-ahead state. Thus, the driving stability of the vehicle can be improved.

Specifically, by positively controlling the turning angle of the front wheels, the vehicle body can be restrained from being subjected to a reactive force in the yawing direction even when the second turning action of the steering wheel is performed quickly. As a result, the yaw rate damping capacity, and therefore, the driving stability of the vehicle, can be improved.

According to a preferred specific arrangement of the present invention, the control means is constructed so that the corrective turning angle for the second turning action of the steering wheel is increased in response to an increase of the angular turning speed of the steering wheel in a first turning action performed before the second turning action. By doing this, a proper corrective turning angle corresponding to the turning state of the steering wheel can be previously set before the second turning action of the steering wheel. Thus, the control operation can be rapidly performed without delay, and the stability of the vehicle can be improved without fail.

According to another preferred specific arrangement, the control means is constructed so that the higher the speed of the vehicle detected by means of a vehicle speed sensor, the wider the corrective turning angle in the second turning action of the steering wheel is. By doing this, stable performance can always be enjoyed even though the vehicle speed varies.

According to still another preferred specific arrangement, moreover, the control means is constructed so that the reference value is reduced in response to an increase of the vehicle speed detected by means of the vehicle speed sensor, or that the corrective turning control signal is not delivered when the vehicle speed detected by means of the sensor is lower than a predetermined vehicle speed. By doing this, the corrective turning of the front wheels can be executed only when a reactive shock in the yawing direction generated during the second turning action of the steering wheel arouses a problem. Thus, unnecessary corrective turning cannot be executed, and the control operation can be performed with accuracy.

According to a further preferred specific arrangement, the control means delivers the corrective turning control signal so that the corrective turning angle of the front wheel takes a target correction value in a predetermined time after the start of corrective control. Thus, the turning angle of the front wheel can be restrained from suddenly changing, and the control operation can be performed without degrading a steering feeling and stability.

The above and other objects, features, and advantages of the invention will be more apparent from the ensuing detailed description taken in connection with the accompanying drawings.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 1 to 10 show a control apparatus according to an embodiment of the present invention, in which:

FIG. 1 is a diagram schematically showing an outline of the apparatus;

FIG. 2 is a longitudinal sectional view showing in detail an arrangement of a planetary gear mechanism for use as a transmission ratio changing mechanism;

FIG. 3 is a cross-sectional view of the changing mechanism;

FIG. 4 is a view showing characteristic curves which illustrate control of the steering gear ratio compared with the vehicle speed and turning angle of the front wheels;

FIG. 6 is a diagram used to obtain a control level $C\theta$;

FIG. 7 is a diagram used to obtain a reference value corresponding to the vehicle speed and angular turning speed of the steering wheel;

FIG. 8 is a timing chart illustrating the corrective turning control during the second turning action;

FIG. 9 shows a timing chart including yaw rate characteristic curve during the second turning action; and FIG. 10 is a diagram schematically showing the way cornering forces act during the second turning action;

FIG. 11 is a timing chart corresponding to FIG. 9, showing characteristics of a conventional vehicle having no steering control apparatus; and FIG. 12 is a diagram schematically showing the way cornering forces act during a second turning action of a steering wheel in the conventional vehicle.

DETAILED DESCRIPTION OF THE PREFERRED EMBODIMENTS

Figure 2:
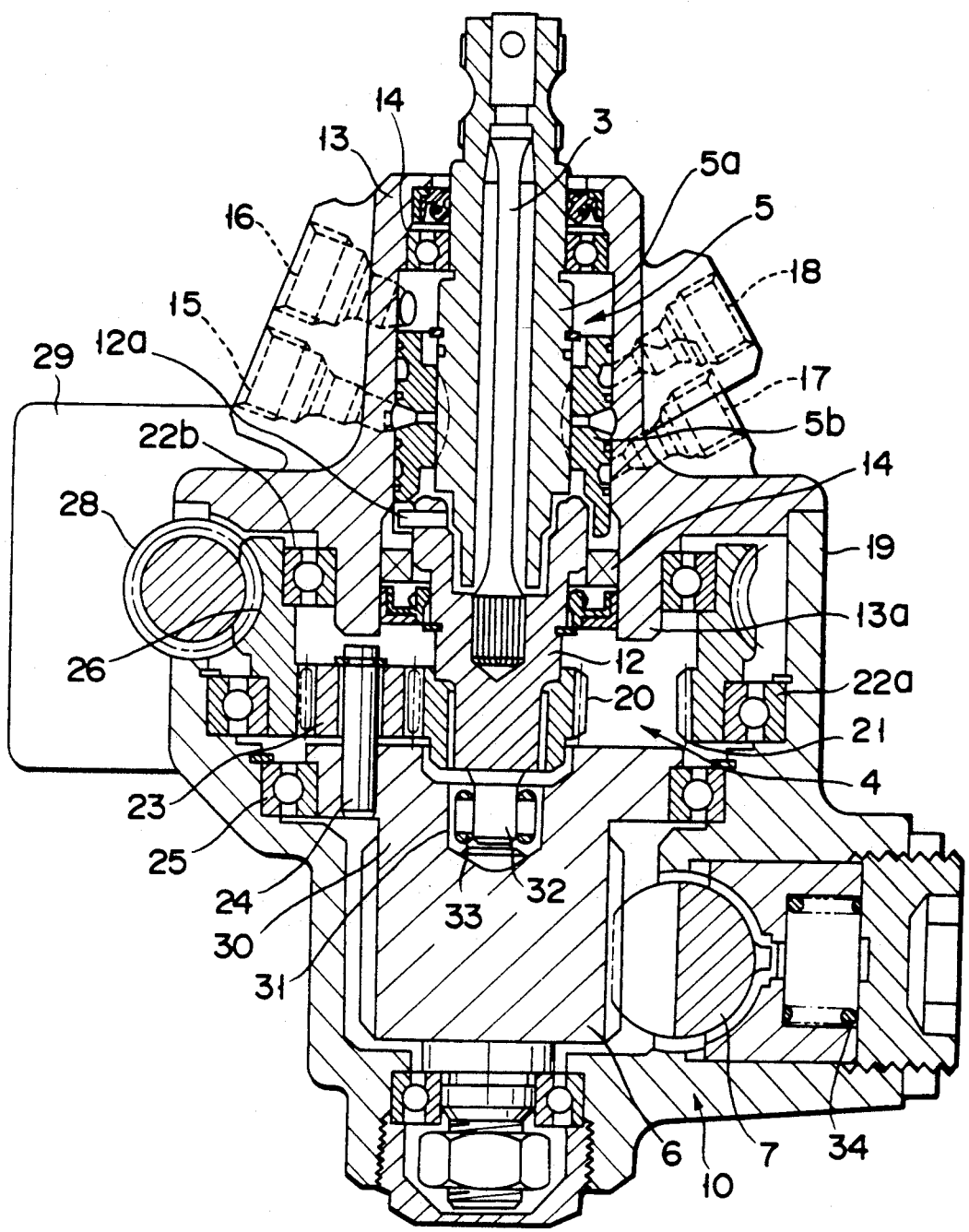

An embodiment of the present invention will now be described in detail with reference to the accompanying drawings.

As shown in FIG. 1, a steering wheel 1 is connected to an input shaft of a planetary gear mechanism 4 by means of a steering shaft 2 and a torsion bar 3. The mechanism 4 constitutes a transmission ratio changing mechanism. A rotary valve 5 of a power steering unit 42 is arranged in parallel with the torsion bar 3, between the gear mechanism 4 and the steering shaft 2. An output shaft of the planetary gear mechanism 4 is connected to a pinion 6 of a rack-and-pinion mechanism 10. A steering rod 7, which has a rack in mesh with the pinion 6, extends in the direction of the width of the body of a vehicle, and tie rods 8 are connected individually to the opposite ends of the rod 7. The outer end of each tie rod 8 is connected to its corresponding front wheel 9 through a knuckle (not shown). In this arrangement, a turn of the steering wheel 1 is transmitted to the tie rods 8 through the steering shaft 2, the planetary gear mechanism 4, and the rack-and-pinion mechanism 10, thereby turning the front wheels 9. The mechanism 4 is provided with a stepping motor 29, which will be mentioned later. The turning angle of the front wheels 9 corresponding to the turn of the steering wheel 1 changes as the stepping motor 29 is operated.

Figure 3:
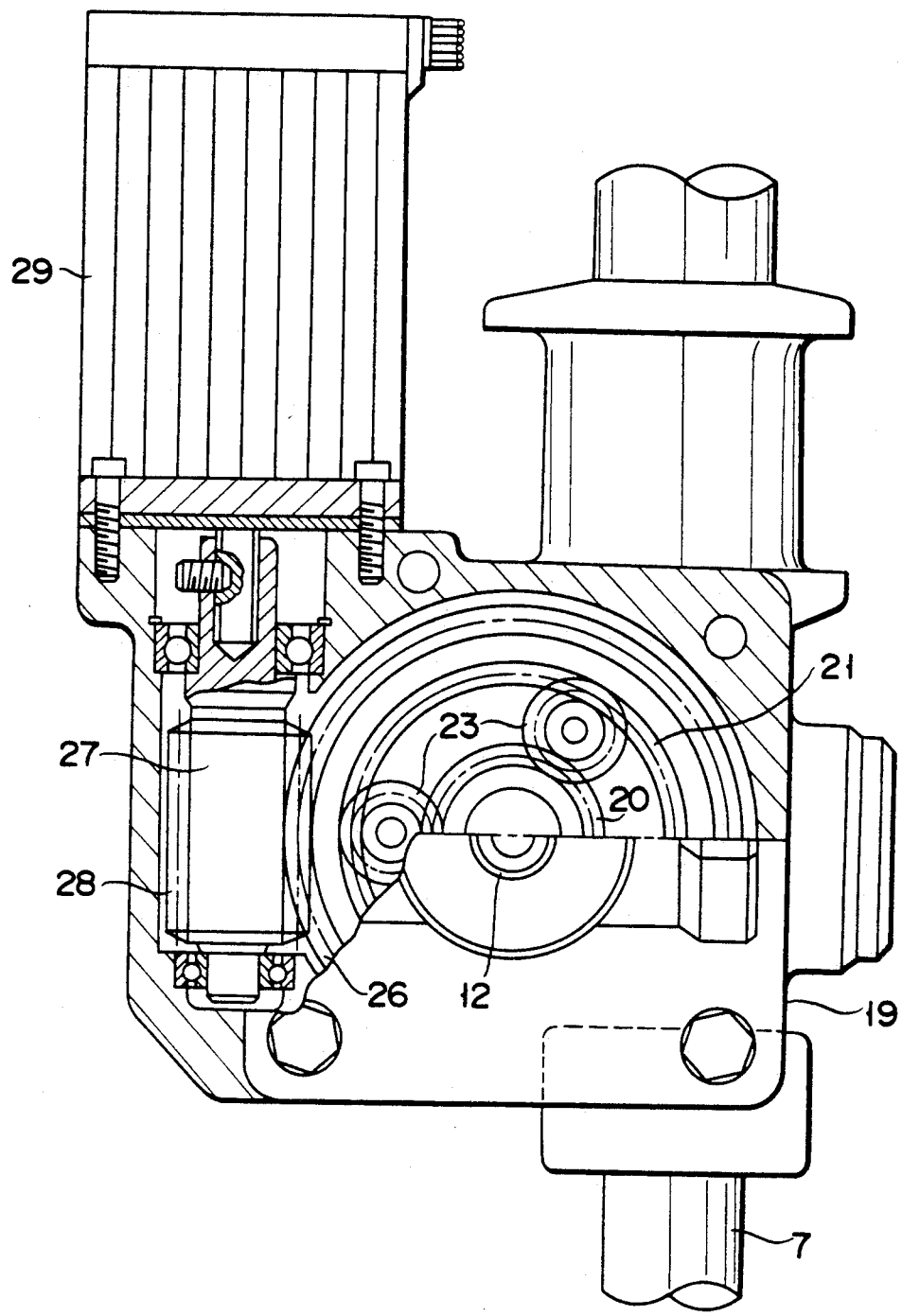

The planetary gear mechanism 4 and the rotary valve 5 are constructed in the manner shown in the detail views of FIGS. 2 and 3. The rotary valve 5 includes an inner valve 5a and an outer valve 5b. The inner valve 5a is connected to the steering shaft 2, and is rotatably supported in a substantially cylindrical housing 13 by means of a pair of bearings 14. The outer valve 5b is rotatably supported between the outer peripheral surface of the inner valve 5a and the inner peripheral surface of the housing 13. The outer valve 5b is connected to the input shaft 12 of the planetary gear mechanism 4 by means of a pin 12a so that it can rotate integrally with the shaft 12. The torsion bar 3 is connected to the upper end of the inner valve 5a and the input shaft 12 and extends coaxial with the valve 5a.

The housing 13 is formed having an inlet port 15, which communicates with a discharge port of an oil pump 40 shown in FIG. 1, and an outlet port 16 which communicates with an oil reservoir 41 (see FIG. 1). Further, the housing 13 has output ports 17 and 18 which communicate individually with left and right pressure chambers of a power cylinder 43 arranged along the axis of the steering rod 7, as shown in FIG. 1.

The rotary valve 5 and its surroundings are constructed substantially in the same manner as those of a conventional power steering unit. As the torsion bar 3 is twisted by a turning force applied from the steering wheel 1, the inner and outer valves 5a and 5b are relatively displaced. Thus, a hydraulic pressure produced depending on the turning force and turning direction of the steering wheel 1 is supplied to the power cylinder 43, so that the front wheels 9 are turned while the turn of the wheel 1 is assisted by the pressure.

A substantially cylindrical housing 19 for containing the planetary gear mechanism 4 is attached to the lower part of the housing 13 for the rotary valve 5. A ring gear 21 is arranged in the housing 19. It is rotatably supported by means of a bearing 22a, which is fixed to the inner peripheral wall of the housing 19, and a bearing 22b fixed to the outer peripheral surface of a cylindrical portion 13a which protrudes from the housing 13. A sun gear 20 is fixed to the lower end of the input shaft 12 of the planetary gear mechanism 4, and is situated coaxial with the ring gear 21. Three planet gears 23 are arranged at regular intervals between the sun gear 20 and the ring gear 21 so as to be in mesh with the gears 20 and 21. Each planet gear 23 is rotatably supported on a pinion shaft 24, which is fixed to a disk-shaped planet gear carrier 30. The carrier 30 is formed integrally with the pinion 6 of the rack-and-pinion mechanism 10. Also, the carrier 30 is rotatably supported by means of a bearing 25, fixed to the inner peripheral surface of the housing 19, and is situated coaxial with the sun gear 20. A recess 31 is formed in the center of the top portion of the carrier 30. A bottom projection 32 of the input shaft 12 is rotatably supported in the recess 31 by means of a bearing 33.

A worm wheel 26 is formed integrally on the outer circumferential surface of the ring gear 21 of the planetary gear mechanism 4. A worm 28 fixed to a rotating shaft 27 is in mesh with the wheel 26. The shaft 27 is connected directly to the stepping motor 29 for use as an actuator. The ring gear 21 is rotated through the medium of the worm 28 and the worm wheel 26 as the motor 29 rotates. Thus, a turning input from the steering wheel 1 applied to the sun gear 20 and an auxiliary input from the stepping motor 29 applied to the ring gear 21 are synthesized by the planetary gear mechanism 4, and the resultant output is delivered from the planet gear carrier 30 to the pinion 6 of the rack-and-pinion mechanism 10. By controlling the operation of the motor 29, the turning angle of the front wheels 9 can be corrected independently of the turning operation of the steering wheel 1.

As shown in FIG. 1, moreover, a solenoid-operated relief valve 44 is arranged between the oil pump 40 and the rotary valve 5. The valve 44 is used to return some of hydraulic oil discharged from the pump 40 to the oil reservoir 41. The oil supply to the rotary valve 5 can be regulated by controlling the operation of the relief valve 44.

The respective operations of the stepping motor 29 and the solenoid-operated relief valve 44 are controlled by means of a controller 45 as control means, which includes a microcomputer. The controller 45 is supplied with detection signals from a transverse acceleration sensor 46, a vehicle speed sensor 47, a turning angle sensor 48, and an angular turning speed sensor 49. The sensor 46, which is located in the front portion of the vehicle body, is used to detect acceleration in the direction of the vehicle body width which acts on the vehicle body. The sensor 47 detects the running speed of the vehicle. The sensors 48 and 49 detect the turning angle and angular turning speed of the steering wheel 1, respectively. The angular turning speed sensor 49 can further detect whether the steering wheel 1 is being in a first turning action or in a second turning action, on the basis of the relationship between the directions of the respective outputs of the sensor 49 and the transverse acceleration sensor 46. The sensors 46, 48 and 49 constitute turning state sensing means.

Based on the respective detection outputs of the sensors 46 to 49, the controller 45 controls the operations of the stepping motor 29 and the solenoid-operated relief valve 44. More specifically, the controller 45 increases the opening of the valve 44, thereby lowering the flow rate of the hydraulic oil supplied to the rotary valve 5, as the vehicle speed increases. Thus, with the increase of the vehicle speed, the hydraulic pressure for turning force assistance produced in the power steering unit 42 drops. During a high-speed drive, therefore, a driver must heavily put forth his or her strength to turn the steering wheel 1, so that the driving stability is improved, and so-called speed-responsive turning force characteristics can be obtained.

The operation of the stepping motor 29 is controlled by means of the controller 45 in a manner such that the overall gear ratio of the steering system varies as indicated by the characteristic curves of FIG. 4, depending on the vehicle speed and the turning angle of the steering wheel 1. Thus, the gear ratio for a low-speed, large turning-angle zone is lowered, so that a wide front-wheel turning angle can be obtained by a lighter steering wheel operation during a low-speed drive. Accordingly, the driver can enjoy the drive with less fatigue.

The controller 45 further controls the operation of the stepping motor 29 for momentarily correcting the front-wheel turning angle during the second turning action of the steering wheel 1. The control operation during the turning action of the controller 45 is performed according to the flow chart of FIGS. 5A and 5B.

Figure 5A:
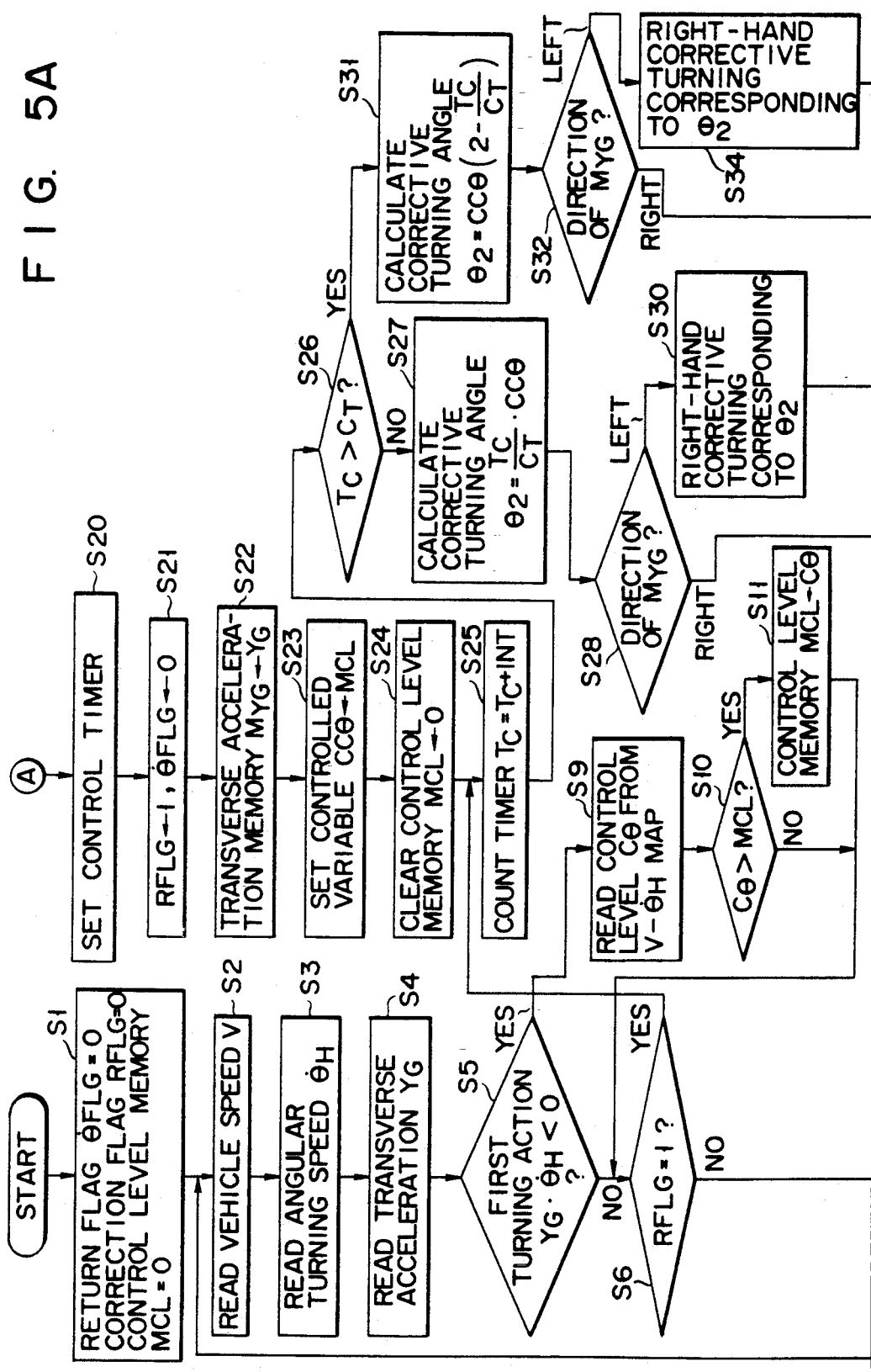
FIGS. 5A and 5B form a flow chart showing processes of corrective turning control during a second turning action of the steering wheel.
Figure 5B:
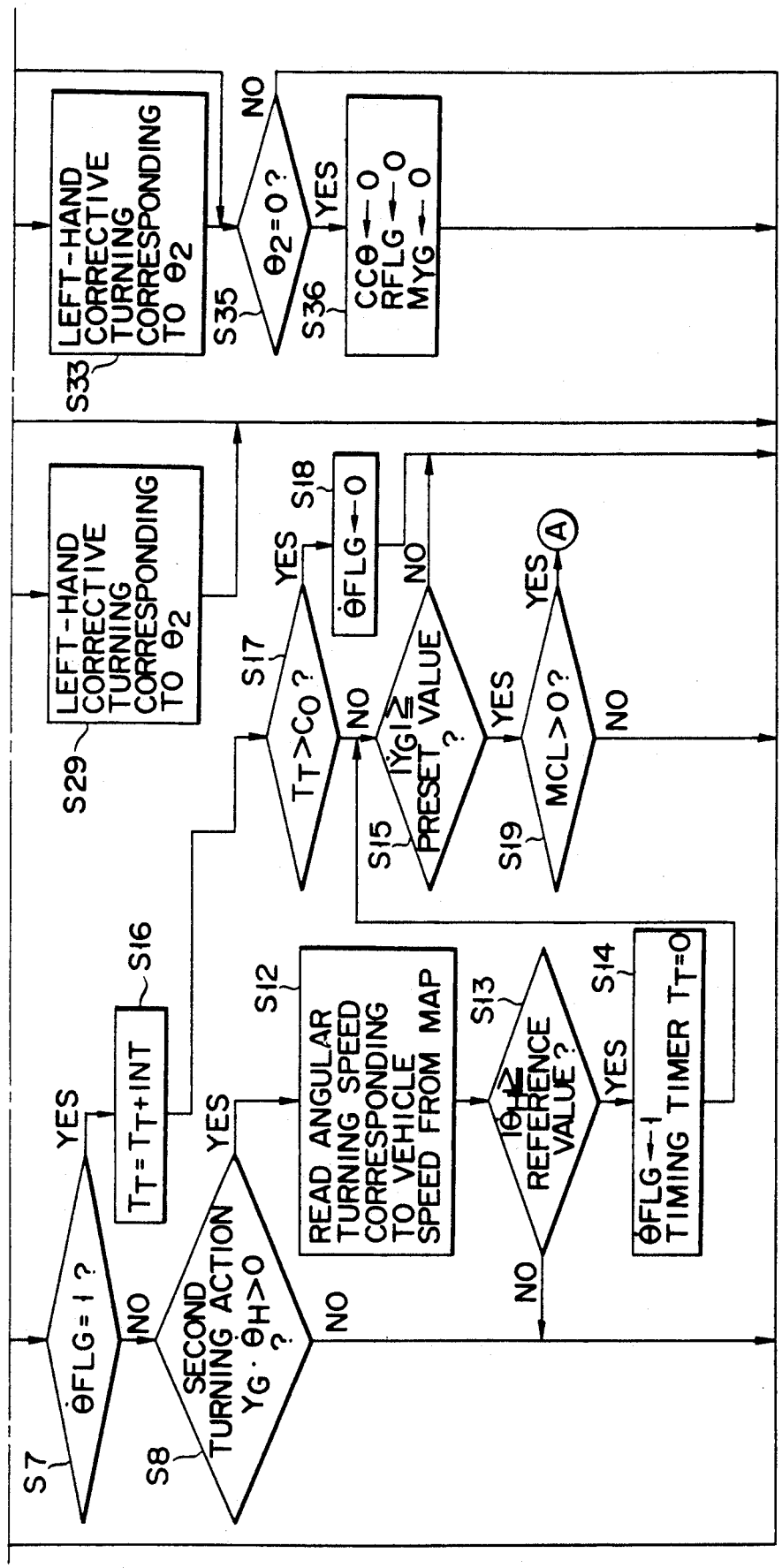

Referring to FIGS. 5A and 5B, the control system is started in response to an on-signal from an ignition-key switch. In Step S1, initial setting is first executed such that a return flag $\theta$FLG, a correction flag RFLG, and a control level memory MCL are individually set to "0". Thereafter, a vehicle speed V detected by means of the vehicle speed sensor 47, an angular turning speed $\dot{\theta}_H$ of the steering wheel 1 detected by means of the angular turning speed sensor 49, and a transverse acceleration $Y_G$ detected by means of the transverse acceleration sensor 46 are read in Steps S2, S3 and S4, respectively. The program proceeds from Step S4 to Step S5, whereupon it is determined whether or not $Y_G \cdot \dot{\theta}_H$ is smaller than 0, that is, whether or not the steering wheel 1 is presently being in a first turning action. In this decision, the first turning action is detected on the basis of the positivity (detecting direction) of the detected values of the angular turning speed and the transverse acceleration. The positivity of the outputs of the transverse acceleration sensor 46 and the angular turning speed sensor 49 is set so that the first turning action of the steering wheel 1 can be detected by the aforesaid decision.

When the vehicle is making a straight advance, the program proceeds from Step S5 to Step S6, whereupon it is determined whether or not the correction flag RFLG is "1". Since the flag RFLG is "0" at the beginning, the program proceeds to Step S7. In Step S7, it is determined whether or not the return flag $\theta$FLG is "1". Since the flag $\theta$FLG is "0" at the beginning, the program proceeds to Step S8. In Step S8, it is determined whether or not $Y_G \cdot \dot{\theta}_H$ is greater than 0, that is, whether or not the present turning state of the steering wheel 1 is in a second turning action, based on the outputs of the sensors 46 and 49. In this case, the vehicle is making a straight advance, so that the program returns to Step S2 after the execution of the process of Step S8, and the execution of the processes of Step S2 and its subsequent steps is repeated.

Figure 6:
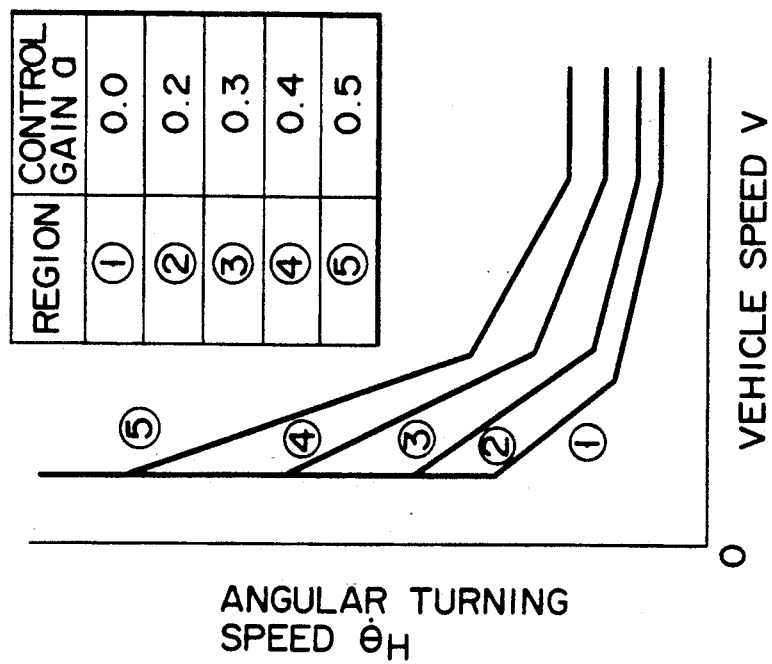

If the steering wheel is turned from the straight-ahead state and the vehicle is subjected to a transverse acceleration, $Y_G \cdot \dot{\theta}_H$ used in the decision in Step S5 is smaller than 0, and the program proceeds from Step S5 to Step S9. In Step S9, the value of a control gain a corresponding to the present vehicle speed V and angular turning speed $\dot{\theta}_H$ is obtained in accordance with a vehicle speed-angular turning speed map shown in FIG. 6, and a control level C$\theta$ of a corrective turning angle is obtained according to the following operational expression using the control gain a.

$$C\theta = \gamma \{ag(1+KV^2)/(V^2/1)\}\rho.$$

Here V is the vehicle speed; K, stability factor; g, acceleration of gravity; l, wheel base; $\rho$, steering gear ratio; and $\gamma$, turning coefficient (constant).

After the control level $C\theta$ is obtained according to the above expression in Step S9, the program proceeds to Step S10, whereupon it is determined whether or not the calculated value of the level $C\theta$ is greater than the stored value in the control level memory MCL. If $C\theta$ is greater, the program proceeds to Step S11, whereupon the value in the memory MCL is rewritten into the value of $C\theta$, and the program then proceeds to Step S6. If $C\theta$ is not greater, the program proceeds directly from Step S10 to Step S6. At the beginning, in this case, the correction flag RFLG and the return flag $\theta$FLG are "0," and the steering wheel 1 is not being in a second turning action, so that the program returns from Step S6 to Step S2 via Steps S7 and S8, and the execution of the processes of Step S2 and its subsequent steps is repeated. In the processes of Steps S9 to S11, the maximum value of the control level $C\theta$ calculated during the first turning motion of the steering wheel 1 is stored in the control level memory MCL.

Figure 7:
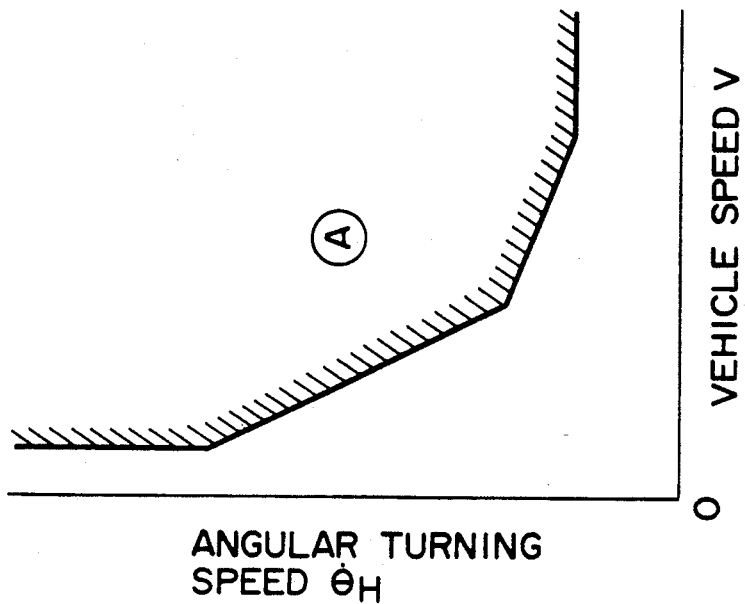

If the driver turns the steering wheel 1 to return the turning or cornering vehicle to the straight-ahead state, that is, if the steering wheel 1 is being in a second turning action, $Y_G \cdot \theta_H$ used in the decision in Step S8 becomes greater than 0, and the program proceeds from Step S8 to Step S12. In Step S12, a reference value of the angular turning speed corresponding to the then vehicle speed V is read out in accordance with the map of FIG. 7. In the next process of Step S13, it is determined whether or not the absolute value of the angular turning speed $\theta_H$ detected by means of the sensor 49 is equal to or larger than the reference value obtained in Step S12 (i.e., whether or not the relationship between the vehicle speed V and the angular turning speed $\theta_H$ is within a hatched region A of FIG. 7). If the absolute value of the speed $\theta_H$ is smaller than the reference value, the program returns to Step S2. If it is concluded in Step S13 that the absolute value of the speed $\theta_H$ is not smaller than the reference value, the program proceeds to Step S14, whereupon the return flag $\theta$FLG is set to "1," and a timing timer $T_T$ is set to "0". After the execution of the process of Step S14, the program proceeds to Step S15, whereupon it is determined whether or not the differential value of the output of the transverse acceleration sensor 46, that is, the absolute value of a transverse jerk $Y_G$ of the vehicle body, is equal to or larger than a predetermined value. If it is concluded in Step S15 that the absolute value of the transverse jerk $Y_G$ of the vehicle body is smaller than the predetermined value, the program returns to Step S2, and the execution of the processes of Step S2 and its subsequent steps is repeated.

The aforesaid timing timer $T_T$ is used because the transverse jerk $Y_G$ not lower than the preset value sometimes may be produced with a delay behind the attainment of the angular turning speed $\theta_H$ not lower than the reference value. Even if the program returns from Step S15 to Step S2, the return flag $\theta$FLG is "1" when Step S7 is reached again, so that the program proceeds to Step S16. In Step S16, a control cycle INT is added to the stored value $T_T$ of the timing timer to effect counting of the timer, and the program then proceeds to Step S17. In Step S17, it is determined whether or not the value $T_T$ of the timing timer is greater than the value of a predetermined time $C_0$. If $T_T$ is greater than $C_0$, the return flag $\theta$FLG is reset to "0" in Step S17, and the program then returns to Step S2. If $T_T$ is not greater than $C_0$, the program proceeds from Step S17 to Step S15, whereupon it is determined whether or not the absolute value of the transverse jerk $Y_G$ is not smaller than the predetermined value. Within the predetermined time $C_0$ after the detection of the turning angular speed $\theta_H$ not lower than the reference value, therefore, a delay, if any, in the generation of the transverse jerk $Y_G$ can be compensated by making the decision of Step S15.

If it is concluded in Step S15 that the absolute value of the transverse jerk $Y_G$ is equal to or larger than the predetermined value, the program proceeds to Step S19, whereupon it is determined whether or not the value in the control level memory MCL is greater than 0. If it is concluded in Step S19 that the value in the memory MCL is not greater than 0, it is concluded that corrective turning need not be effected, whereupon the program returns to Step S2, and the execution of the processes of Step S2 and its subsequent steps is repeated. If it is concluded in Step S19 that the value in the control level memory MCL is greater than 0, then it indicates a situation such that the steering wheel 1 is being sharply returned to its straight-ahead position after it is sharply turned from the straight-ahead position, and that the transverse acceleration acting on the vehicle body is being rapidly reduced. In this case, the vehicle body is liable to be subjected to a reactive shock in the yawing direction, so that the processes of Step S20 and its subsequent steps for the turning angle correction are executed.

More specifically, if it is concluded in Step S19 that the value in the control level memory MCL is greater than 0, the program proceeds to Step S20, whereupon a stored value $T_C$ in a control timer is set to 0. In the following process of Step S21, thereafter, the correction flag RFLG is set to "1," while the return flag $\theta$FLG is reset to "0". In the next process of Step S22, the output $Y_G$ of the transverse acceleration sensor 46 is stored in a transverse acceleration memory $M_{YG}$. In Step S23, thereafter, the value in the control level memory MCL is set as a controlled variable $CC\theta$, which is used as a target for corrective turning. The memory MCL is cleared in the subsequent process of Step S24. After the execution of the process of Step S24, the program proceeds to Step S25, whereupon the control cycle INT is added to the stored value $T_C$ of the control timer to effect counting of this timer, and the program then proceeds to Step S26. In Step S26, it is determined whether or not the value $T_C$ in the control timer is greater than the value of a predetermined time $C_T$. If the value $T_C$ is not greater than the value $C_T$, the program proceeds to Step S27, whereupon a correction value $\theta_2$ of the turning angle of the front wheels is calculated according to the following expression.

$$\theta_2 = CC\theta \, (T_C/C_T),$$

where $CC\theta$ and $C_T$ are the controlled variable and rise/fall time, respectively.

After the execution of the process of Step S27, the program proceeds to Step S28, whereupon it is determined whether the stored value in the transverse acceleration memory is right-hand (corresponding to a left-handed turn) or left-hand (corresponding to a right-handed turn). If the result of decision in Step S28 is "right-hand (left-handed turn)", the program proceeds to Step S29, whereupon the operation of the stepping motor 29 is controlled so that the front 8 wheels are correctively turned to the left for the angle $\theta_2$. If the result of decision in Step S28 is "left-hand (right-handed turn)", the program proceeds to Step S30, whereupon the operation of the motor 29 is controlled so that the front wheels are correctively turned to the right for the angle $\theta_2$. After the execution of the process of Step S29 or S30, the program returns to Step S2. At this point of time, the correction flag RFLG is "1," so that the program proceeds from Step S6 to Step S25, whereupon the timer value $T_C$ is increased, and the the program then proceeds again to Step S26. In the operational expression of Step S27 used when the value $T_C$ in the control timer is not greater than the value of the predetermined time $C_T$, $\theta_2$ increases with the increase of the value $T_C$. Before the control timer value $T_C$ reaches the value $C_T$, therefore, the correction value $\theta_2$ of the turning angle increases with the lapse of time. When the value $T_C$ reaches the value of the predetermined time $C_T$, $\theta_2$ is equal to $CC\theta$, so that the front wheels are subjected to corrective turning for a target value having so far been stored as the target controlled variable $CC\theta$ for this point of time.

If the value $T_C$ in the control timer becomes greater than the value of the predetermined time $C_T$, the program proceeds from Step S26 to Step S31, whereupon the operational expression for the front-wheel turning angle correction value $\theta_2$ is modified into the following expression, and the turning angle correction value $\theta_2$ is calculated according to this expression.

$$\theta_2 = CC\theta\ (2 - T_C/C_T).$$

After the execution of the process of Step S31, the program proceeds to Step S32, whereupon it is determined whether the stored value in the transverse acceleration memory is right-hand (corresponding to a left-handed turn) or left-hand (corresponding to a right-handed turn). If the result of decision in Step S32 is "right-hand (left-handed turn)", the program proceeds to Step S33, whereupon the operation of the stepping motor 29 is controlled so that the front wheels are subjected to left-hand corrective turning for the value $\theta_2$. If the result of decision in Step S32 is "left-hand (right-handed turn)", the program proceeds to Step S34, whereupon the operation of the motor 29 is controlled so that the front wheels are subjected to right-hand corrective turning for the value $\theta_2$. After the execution of the process of Step S33 or S34, it is determined in Step S35 whether or not the present corrective turning angle $\theta_2$ is 0. If $\theta_2$ is not 0, the program returns to Step S2, and then proceeds from Step S6 to Step S31 again via Step S26. In the operational expression of Step S31, $\theta_2$ decreases with the increase of the value $T_C$ in the control timer. Before the control timer value $T_C$ reaches the value of a predetermined time $2C_T$, therefore, the correction value of the turning angle decreases with the lapse of time. When the value $T_C$ becomes equal to $2C_T$, the corrective turning angle $\theta_2$ becomes 0, so that the front wheels cease to be correctively turned, and the program proceeds from Step S35 to Step S36. In Step S36, the controlled variable $CC\theta$, the correction flag RFLG, and the transverse acceleration memory $M_{YG}$ are individually reset to "0". After the execution of the process of Step S36, the execution of the processes of Step S2 and its subsequent steps is repeated again.

If, after the second turning action of the steering wheel, the driver continuously performs a first turning action in a direction opposite the direction of the previous first turning action, the program proceeds from Step S5 to Steps S8, S9, and S10, whereupon necessary arrangements are made for the next second turning action of the steering wheel. Thereafter, the program proceeds to Step S6, so that the processes of Step S20 and its subsequent steps are executed as long as the correction flag RFLG is "1", and corrective turning is executed so that the flag RFLG becomes "0". In this situation, arrangements for corrective turning for the next second turning action are made while the corrective turning concerned is being executed. Thus, the corrective turning of the front wheels during the second turning action of the steering wheel ca be executed continually.

According to the embodiment described above, the level MCL ($=CC\theta$) of the controlled variable required for the second turning action is estimated from the vehicle speed V and the angular turning speed $\dot{\theta}_H$ detected when the steering wheel 1 is in a first turning action. Further, if the angular turning speed $\dot{\theta}_H$ of the steering wheel 1 in the second turning action is equal to or larger than the reference value corresponding to the vehicle speed, and when it is detected that the rate $\dot{Y}_G$ of change of the transverse acceleration is equal to or larger than the preset value, control is executed such that the front wheels are given a corrective turn for the estimated controlled variable $CC\theta$ in the direction of the second turning action.

Figure 8:
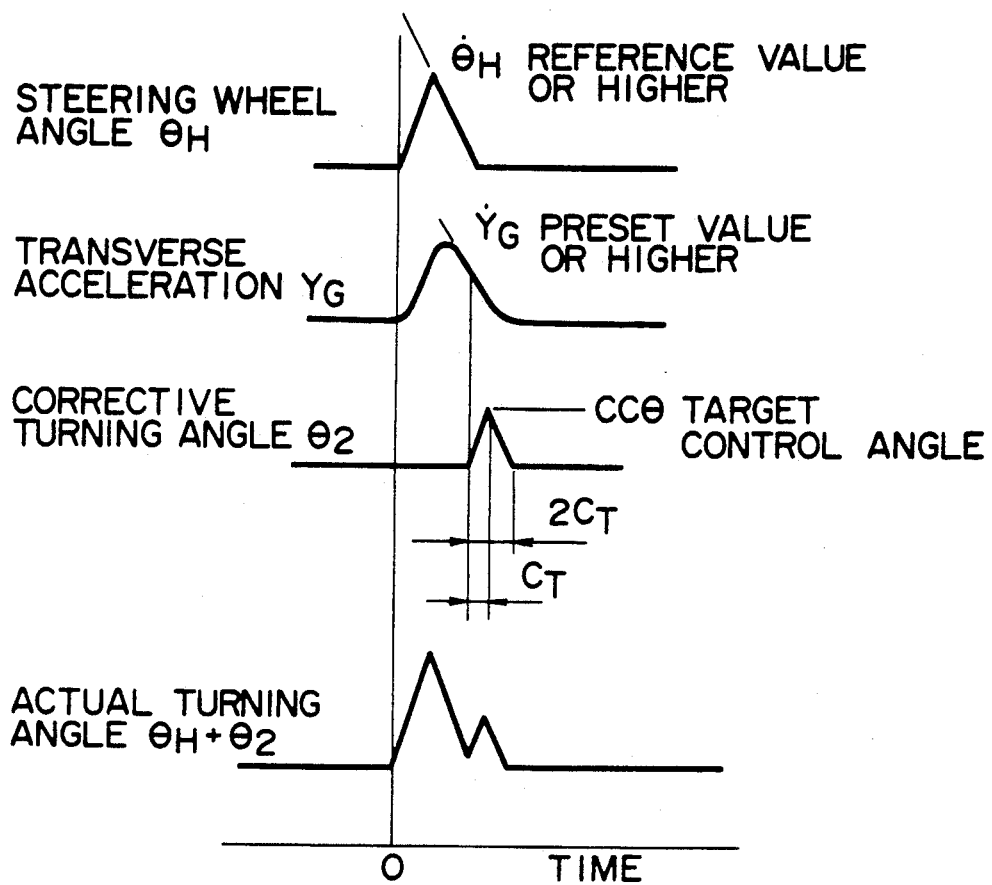

Thus, as shown in FIG. 8, the corrective turning angle $\theta_2$ inputted from the stepping motor 29 is added to the turning angle $\theta_H$ inputted from the steering wheel 1 to control the actual turning angle of the front wheels during the predetermined time $2C_T$ after the rate $Y_G$ of change of the transverse acceleration becomes equal to or larger than the preset value, while the steering wheel is being in the second turning action at a speed equal to or larger than the reference angular turning speed, whereupon the corrective turning angle $\theta_2$ attains the target corrective turning angle $CC\theta$ in the time $C_T$ after the start of the control.

Figure 10:
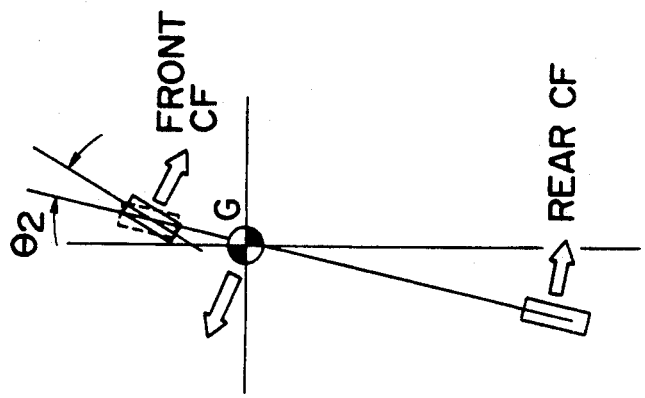
Figure 9:
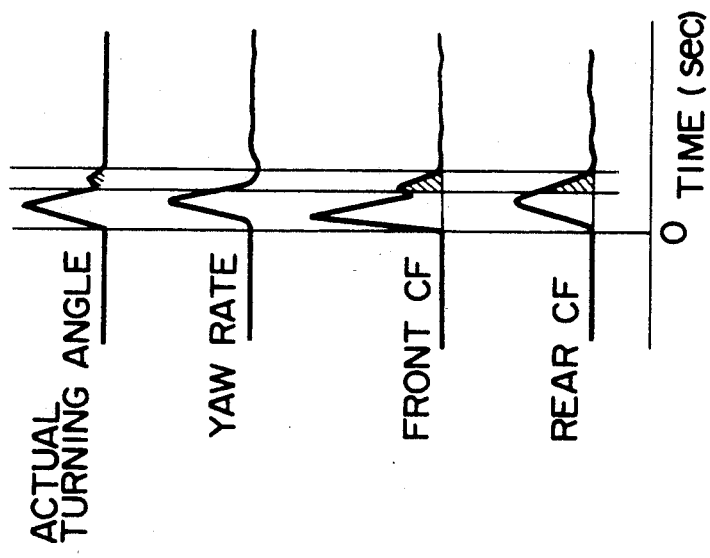

By effecting the control described above, the cornering force CF of the front wheels is increased to be balanced with that of the rear wheels, as shown in FIGS. 9 and 10, so that it can be prevented from becoming much smaller than the cornering force of the rear wheels when the vehicle body is returned from a turning or cornering state to the straight-ahead state. Accordingly, the astringency of the yaw rate is improved so that the straight advance position of the vehicle body can be restored with reliability even in case of sudden turning, and the responsiveness of the vehicle body to the driver's turning input is flat.

The stepping motor 29, for use as the actuator for corrective turning, is also used to change the steering gear ratio in accordance with the vehicle speed and the turning angle of the steering wheel, thereby improving the handleability of the steering wheel. Thus, a multifunctional steering control apparatus can be obtained having a relatively simple construction.

The present invention is not limited to the embodiment described above. For example, the transmission ratio changing mechanism used may be of any other type, and a yaw rate sensor may naturally be used for the purpose. Further, only the angular turning speed of the steering wheel may be used as the reference for the execution of corrective turning during the second turning action of the steering wheel, without using the transverse acceleration sensor, and the corrective turning angle may be set as a fixed value. It is to be understood, moreover, that various other changes and modifications may be effected in the present invention by one skilled in the art without departing from the scope or spirit of the invention.

What is claimed is:

1. A steering control apparatus for a vehicle, comprising:
    a transmission ratio changing mechanism located between a steering wheel and front wheels of the vehicle, for changing a turning angle of the front wheels, which is caused by turning the steering wheel;
    an actuator for driving the transmission ratio changing mechanism to correct the turning angle of the front wheels;
    turning state sensing means for detecting a first turning action, a second turning action in a direction opposite to a direction of the first turning action, and an angular turning speed of the steering wheel; and
    control means for controlling the operation of the actuator in accordance with the detection signals from the turning state sensing means,
    the control means including means for comparing a value of the angular turning speed of the steering wheel for the second turning action with a reference value, and output means for outputting a corrective turning control signal, for increasing the turning angle of the front wheels by a predetermined corrective turning angle, to the actuator when the comparing means detects that the value of the angular turning speed of the steering wheel is at least equal to the reference value, during the second turning action of the steering wheel.

2. The apparatus of claim 1, wherein said control means includes means for increasing the corrective turning angle during the second turning action of the steering wheel in response to an increase of the angular turning speed for the first turning action performed before the second turning action.

3. The apparatus of claim 2, wherein said control means includes means for determining a degree of the corrective turning angle in response to a maximum value of the angular turning speed for the first turning action of the steering wheel performed before the second turning action.

4. The apparatus of claim 1, further comprising:
    a vehicle speed sensor for detecting the speed of the vehicle, wherein said control means includes means for increasing the corrective turning angle relative to increasing vehicle speed detected by the vehicle speed sensor.

5. The apparatus of claim 1, further comprising:
    a vehicle speed sensor for detecting the speed of the vehicle, wherein said control means includes means for reducing the reference value relative to increasing vehicle speed detected by the vehicle speed sensor.

6. The apparatus of claim 1, further comprising:
    a vehicle speed sensor for detecting the speed of the vehicle, wherein said control means includes means for inhibiting output of the corrective turning control signal from the output means when the vehicle speed detected by the vehicle speed sensor is below a predetermined vehicle speed.

7. The apparatus of claim 1, wherein said turning state sensing means includes transverse acceleration sensing means for detecting a transverse acceleration acting on a body of the vehicle, and said control means includes second comparing means for comparing the transverse acceleration detected by the transverse acceleration sensing means with a reference acceleration, during a predetermined period of time after the first comparing means detects that the value of the angular turning speed of the steering wheel for the second turning action is at least equal to the reference value, and means for inhibiting output of the corrective turning control signal from the output means as long as the second comparing means detects that the transverse acceleration is at most, equal to the reference acceleration.

8. The apparatus of claim 1, wherein said output means includes first adjusting means for adjusting the corrective turning control signal so that the corrective turning angle of the front wheels takes a target value in a first predetermined period of time after the delivery of the corrective turning control signal.

9. The apparatus of claim 8, wherein said output means includes second adjusting means for adjusting the control signal so that the corrective turning angle of the front wheels becomes zero in a second predetermined period of time after the passage of the first predetermined period of time.

10. The apparatus of claim 9, wherein said first and second predetermined period of times are equal to each other.

11. The apparatus of claim 1, wherein said turning state sensing means includes an angular turning speed sensor for detecting the angular turning speed of the steering wheel and for outputting detection signals of different polarities, differing depending on the turning direction of the steering wheel, and a transverse acceleration sensor for detecting a transverse acceleration acting on a body of the vehicle and for outputting detection signals of different polarities, differing depending on the direction of the acceleration, and wherein said control means includes means for discriminating the second turning action of the steering wheel by the relationship between the polarity of the detection signal from the angular turning speed sensor and the polarity of the detection signal from the transverse acceleration sensor.

12. The apparatus of claim 1, wherein said control means includes means for setting a controlled variable in accordance with the angular turning speed detected by the turning state sensing means when the steering wheel is in the first turning action, and means for determining a degree of the corrective turning angle of the front wheels on the basis of the set controlled variable when it is detected by the comparing means that the value of the angular turning speed of the steering wheel for the second turning action is at least equal to the reference value, and said output means delivers the corrective turning control signal for increasing the turning angle of the front wheels to the actuator.

13. The apparatus of claim 1, wherein said transmission ratio changing mechanism includes a planetary gear mechanism having a sun gear, a plurality of planet gears arranged around the sun gear and in mesh therewith, supporting means for supporting the plurality of planet gears for rotation, and a ring gear situated around the planet gears and in mesh therewith, one of the sun gear and the supporting means being connected to the steering wheel by a steering shaft, and the other of the sun gear and the supporting means being connected to the front wheel side, and wherein the actuator drives the ring gear to rotate.

14. A steering control apparatus for a vehicle, comprising:
- means, connected between a steering wheel and front wheels, for turning the front wheels in accordance with the turning of the steering wheel;
- means for correcting a turning angle caused in the front wheels by the turning means;
- sensing means for detecting a first turning action, a second turning action in a direction opposite to a direction of the first turning action, and an angular turning speed of the steering wheel; and
- control means for controlling the operation of the correcting means in accordance with the detection signals from the sensing means,
- the control means including means for comparing a value of the angular turning speed of the steering wheel for the second turning action with a reference value, and output means for delivering a corrective turning control signal, used to increase the turning angle of the front wheels by a corrective turning angle for making a cornering force, produced in the front wheels during the second turning action, substantially equal to a cornering force produced in the rear wheels, to the correcting means when the comparing means detects that the value of the angular turning speed is at least equal to the reference value.

15. The apparatus of claim 14, wherein said control means includes means for setting a controlled variable in accordance with the angular turning speed detected during the first turning action of the steering wheel performed immediately before the second turning action of the steering wheel at the angular turning speed at least equal to the reference value, and means for determining a degree of the corrective turning angle on the basis of the controlled variable.

16. A steering control apparatus for controlling turn angle of at least one of a plurality of wheels of a vehicle, comprising:
- turn controller, connected to at least one of the wheels, for controlling turn angle of the at least one wheel;
- turning state sensor for detecting a first turn action of a steering wheel of the vehicle, a second turn action in a direction opposite the first turn action, and an angular turn speed of the steering wheel; and
- controller for outputting corrective turn control signals to the turn controller to vary turn angle of the at least one wheel in response to the turning state sensor detecting the second turn action of the steering wheel and detecting the angular turn speed of the steering wheel to be at least a predetermined value.

17. The steering control apparatus of claim 16, wherein the turn controller controls turn angle of two front wheels of the vehicle, and the controller outputs corrective turn control signals to vary said turn angle of the two front wheels of the vehicle.

18. The steering control apparatus of claim 17, wherein the turn controller includes,
- transmission ratio changer, connected to the front wheels, for varying said turn angle of the two front wheels; and
- actuator, connected to the transmission ratio changer, for driving the transmission ratio changer to correct said turn angle of the two front wheels in response to the output corrective turn control signals of the controller.

19. The steering control apparatus of claim 16, wherein the controller outputs said corrective turn control signals to the turn controller to increase turn angle of the at least one wheel in response to the turning state sensor detecting the second turn action of the steering wheel and detecting the angular speed of the steering wheel to be at least said predetermined value.

20. The steering control apparatus of claim 17, wherein the controller outputs said corrective turn control signals to the turn controller to increase turn angle of the two front wheels in response to the turning state sensor detecting the second turn action of the steering wheel and detecting the angular speed of the steering wheel to be at least said predetermined value.

21. The steering control apparatus of claim 16, wherein the controller outputs said corrective turn control signals to the turn controller to increase turn angle of the at least one wheel in response to the turning state sensor detecting the angular turn speed of the steering wheel in the first turn action to be at least the predetermined value, prior to detecting the second turn action.

22. The steering control apparatus of claim 17, wherein the controller outputs said corrective turn control signals to the turn controller to increase turn angle of the two front wheels in response to the turning state sensor detecting the angular turn speed of the steering wheel in the first turn action to be at least the predetermined value, prior to detecting the second turn action.

23. The steering control apparatus of claim 16, further comprising:
- speed sensor for sensing speed of the vehicle and for outputting the sensed speed to the controller,
- wherein the controller outputs said corrective turn control signals, increased relative to the sensed speed increasing, to the turn controller to vary said turn angle of the at least one wheel.

24. The steering control apparatus of claim 17, further comprising:
- speed sensor for sensing speed of the vehicle and for outputting the sensed speed to the controller,
- wherein the controller outputs said corrective turn control signals, increased relative to the sensed speed increasing, to the turn controller to vary said turn angle of the two front wheels.

25. The steering control apparatus of claim 23, wherein the predetermined value is reduced relative to the sensed speed increasing.

26. The steering control apparatus of claim 24, wherein the predetermined value is reduced relative to the sensed speed increasing.

27. The steering control apparatus of claim 23, wherein the output corrective turn control signals are inhibited upon the speed sensor outputting said sensed speed below a predetermined vehicle speed.

28. The steering control apparatus of claim 24, wherein the output corrective turn control signals are inhibited upon the speed sensor outputting said sensed speed below a predetermined vehicle speed.

29. A method for controlling turn angle of at least one of a plurality of wheels of a vehicle, comprising the steps of:
- (a) detecting a first turn action of a steering wheel of the vehicle, a second turn action in a direction opposite the first turn action, and an angular turn speed of the steering wheel;

(b) outputting, from a controller, corrective turn control signals to a turn controller, connected to at least one of the plurality of wheels, to vary turn angle of the at least one wheel in response to detecting the second turn action of the steering wheel and detecting the angular turn speed of the steering wheel to be at least a predetermined value.

30. The method of claim 29, wherein the turn controller controls turn angle of two front wheels of the vehicle, and, in said step (b), said corrective turn control signals are output to vary said turn angle of the two front wheels of the vehicle.

31. The method of clam 29, wherein, in said step (b), said corrective turn control signals are output to the turn controller to increase turn angle of that at least one wheel in response to detecting the second turn action of the steering wheel and detecting the angular speed of the steering wheel to be at least said predetermined value in said step (a).

32. The method of claim 30, wherein in said step (b), said corrective turn control signals are output to the turn controller to increase said turn angle of the two front wheels in response to detecting the second turn action of the steering wheel and detecting the angular speed of the steering wheel to be at least said predetermined value in said step (a).

33. The method of claim 29, wherein in said step (b), said corrective turn control signals are output to the turn controller to increase said turn angle of the at least one wheel in response to detecting the angular turn speed of the steering wheel in the first turn action to be at least the predetermined value, prior to detecting the second turn action in said step (a).

34. The method of claim 30, wherein in said step (b), said corrective turn control signals are output to the turn controller to increase said turn angle of the two front wheels in response to detecting the angular turn speed of the steering wheel in the first turn action to be at least the predetermined value, prior to detecting the second turn action in said step (a).

35. The method of claim 29, further comprising the step of:
(c) sensing speed of the vehicle, wherein, in said step (b), said corrective turn control signals, increased relative to the sensed speed increasing, are output to the turn controller to vary said turn angle of the at least one wheel.

36. The method of claim 30, further comprising the step of:
(c) sensing speed of the vehicle, wherein in said step (b), said corrective turn control signals, increased relative to the sensed speed increasing, are output to the turn controller to vary said turn angle of the front wheels.

37. The method of claim 35, wherein the predetermined value is reduced relative to the sensed speed increasing.

38. The method of claim 36, wherein the predetermined value is reduced relative to the sensed speed increasing.

39. The method of claim 35, wherein, in said step (b), the output corrective turn control signals are inhibited upon the speed sensor outputting said sensed speed below a predetermined vehicle speed in said step (c).

40. The method of claim 36, wherein, in said step (b), the output corrective turn control signals are inhibited upon the speed sensor outputting said sensed speed below a predetermined vehicle speed in said step (c).

* * * * *